US011453115B2

(12) United States Patent
Kobari

(10) Patent No.: US 11,453,115 B2
(45) Date of Patent: Sep. 27, 2022

(54) ROBOT SYSTEM AND CONTROL METHOD FOR ROBOT SYSTEM

(71) Applicant: Seiko Epson Corporation, Tokyo (JP)

(72) Inventor: Yuki Kobari, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/083,440

(22) Filed: Oct. 29, 2020

(65) Prior Publication Data
US 2021/0129314 A1   May 6, 2021

(30) Foreign Application Priority Data

Oct. 30, 2019   (JP) .............................. JP2019-197243

(51) Int. Cl.
| B25J 5/00 | (2006.01) |
| B25J 9/12 | (2006.01) |
| B25J 13/08 | (2006.01) |
| B25J 19/00 | (2006.01) |

(52) U.S. Cl.
CPC ................. *B25J 5/007* (2013.01); *B25J 9/12* (2013.01); *B25J 13/088* (2013.01); *B25J 19/0004* (2013.01)

(58) Field of Classification Search
CPC ... B25J 5/007; B25J 9/12; B25J 9/1602; B25J 13/088; B25J 19/0004; B25J 19/005; B25J 19/0095
See application file for complete search history.

(56) References Cited

U.S. PATENT DOCUMENTS

| 2018/0326576 A1 * | 11/2018 | Riedel ...................... B25J 5/007 |
| 2021/0094184 A1 * | 4/2021 | Gilchrist ................ B25J 19/027 |
| 2021/0362341 A1 * | 11/2021 | Cote .......................... B25J 9/04 |

FOREIGN PATENT DOCUMENTS

| CN | 108583396 A | * | 9/2018 | |
| EP | 3398729 A1 | * | 11/2018 | .............. B25J 5/007 |
| JP | 2001-096487 A | | 4/2001 | |
| WO | WO-2021107086 A1 | * | 6/2021 | ............... B25J 5/00 |

* cited by examiner

*Primary Examiner* — Dale Moyer
(74) *Attorney, Agent, or Firm* — Harness, Dickey & Pierce, P.L.C.

(57) ABSTRACT

A robot system includes a robot having a base, a robot arm coupled to the base, a motor that drives the robot arm, a supply unit that supplies electric power to the motor, and a switch mechanism that switches between a conduction state in which the motor and the supply unit are conducting and a non-conduction state in which the motor and the supply unit are not conducting, and a vehicle having a movement mechanism that transports the robot and an operation portion that operates the switch mechanism and turns the conduction state to the non-conduction state, and being configured to take a coupled state in which the vehicle is coupled to the base and a decoupled state in which the vehicle is decoupled from the base, wherein the operation portion operates the switch mechanism in the coupled state.

9 Claims, 12 Drawing Sheets

ROBOT SYSTEM AND CONTROL METHOD FOR ROBOT SYSTEM

The present application is based on, and claims priority from JP Application Serial Number 2019-197243, filed Oct. 30, 2019, the disclosure of which is hereby incorporated by reference herein in its entirety.

BACKGROUND

1. Technical Field

The present disclosure relates to a robot system and control method for robot system.

2. Related Art

Recently, in factories, due to labor cost rise and labor shortage, work manually performed in the past has been increasingly automated by various robots and robot peripherals. The various robots include e.g. a mobile robot in which a robot arm is mounted on an automated guided vehicle having a traveling mechanism as disclosed in JP-A-2001-96487.

In the mobile robot shown in JP-A-2001-96487, a fixed position confirmation switch is provided in the automated guided vehicle. During traveling, the robot arm takes a posture to press the fixed position confirmation switch. Further, JP-A-2001-96487 discloses a configuration for emergency stop of the traveling mechanism and the robot arm when the robot arm malfunctions during traveling and the pressing of the fixed position confirmation switch is released.

However, in JP-A-2001-96487, during traveling, electric power can be supplied to the robot arm and, for example, when a control apparatus malfunctions, the robot arm may unintentionally move.

SUMMARY

The present disclosure has been achieved to solve at least a part of the above described problem and can be implemented as follows.

A robot system according to an application example includes a robot having a base, a robot arm coupled to the base, a drive source that drives the robot arm, a supply unit that supplies electric power to the drive source, and a switch mechanism that switches between a conduction state in which the drive source and the supply unit are conducting and a non-conduction state in which the drive source and the supply unit are not conducting, and a vehicle having a movement mechanism that transports the robot and an operation portion that operates the switch mechanism and turns the conduction state to the non-conduction state, and being configured to take a coupled state in which the vehicle is coupled to the base and a decoupled state in which the vehicle is decoupled from the base, wherein the operation portion operates the switch mechanism in the coupled state.

A control method for a robot system according to an application example is a control method for a robot system including a robot having a base, a robot arm coupled to the base, a drive source that drives the robot arm, a supply unit that supplies electric power to the drive source, and a switch mechanism that switches between a conduction state in which the drive source and the supply unit are conducting and a non-conduction state in which the drive source and the supply unit are not conducting, a vehicle having a movement mechanism that transports the robot and an operation portion that operates the switch mechanism and turns the conduction state to the non-conduction state, and being configured to take a coupled state in which the vehicle is coupled to the base and a decoupled state in which the vehicle is decoupled from the base, and a detection unit that detects a position relationship between the robot and the vehicle, and the control method includes determining whether or not the base and the vehicle can be coupled based on a detection result of the detection unit, and operating the switch mechanism by the operation portion by bringing at least one of the robot and the vehicle closer to the other based on a determination result at the determination step.

DESCRIPTION OF EXEMPLARY EMBODIMENTS

As below, a robot system and control method for robot system according to the present disclosure will be explained in detail based on preferred embodiments shown in the accompanying drawings.

First Embodiment

Figure 5:
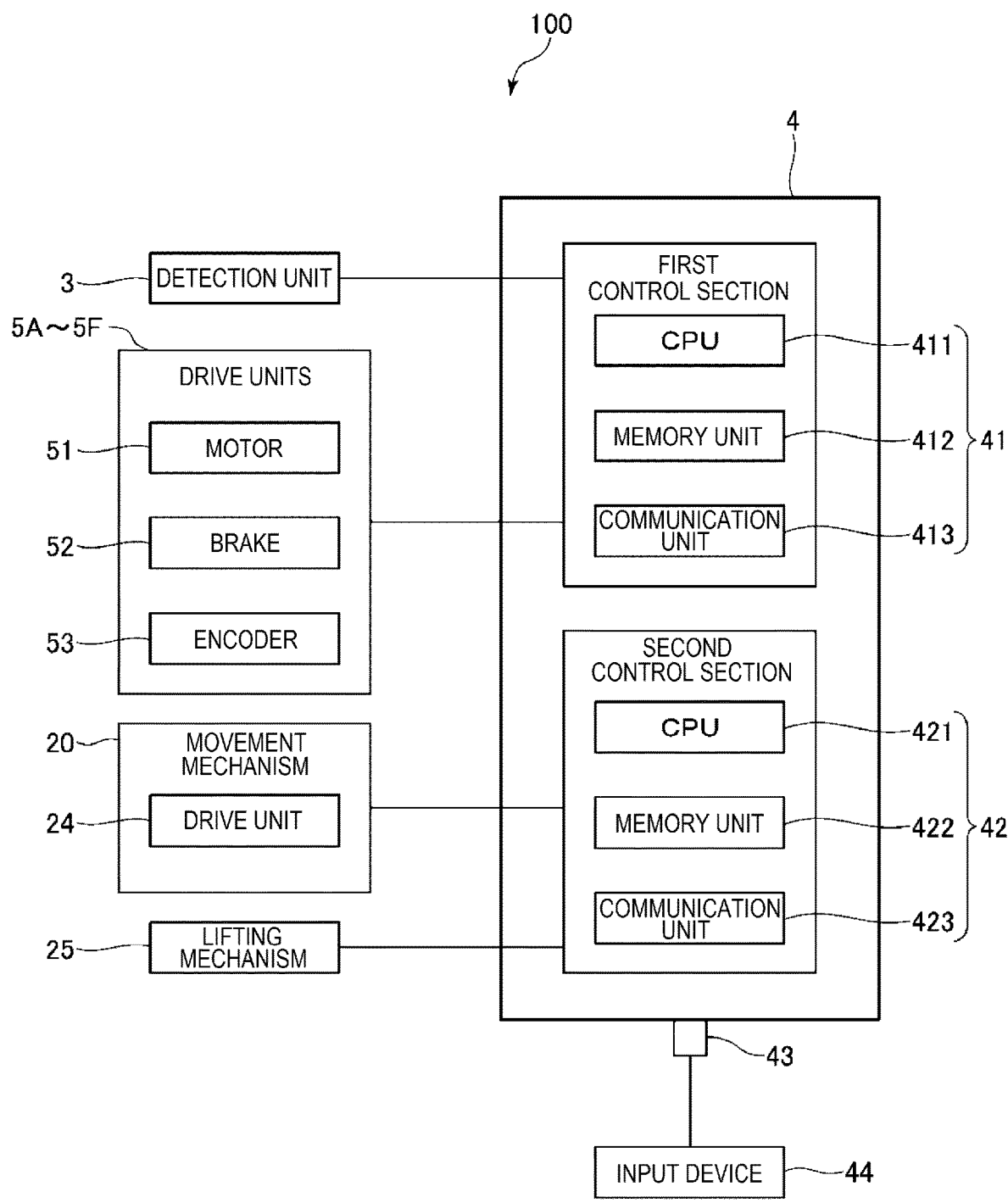
FIG. 5 is a block diagram of the robot system shown in FIGS. 1 to 4.
Figure 6:
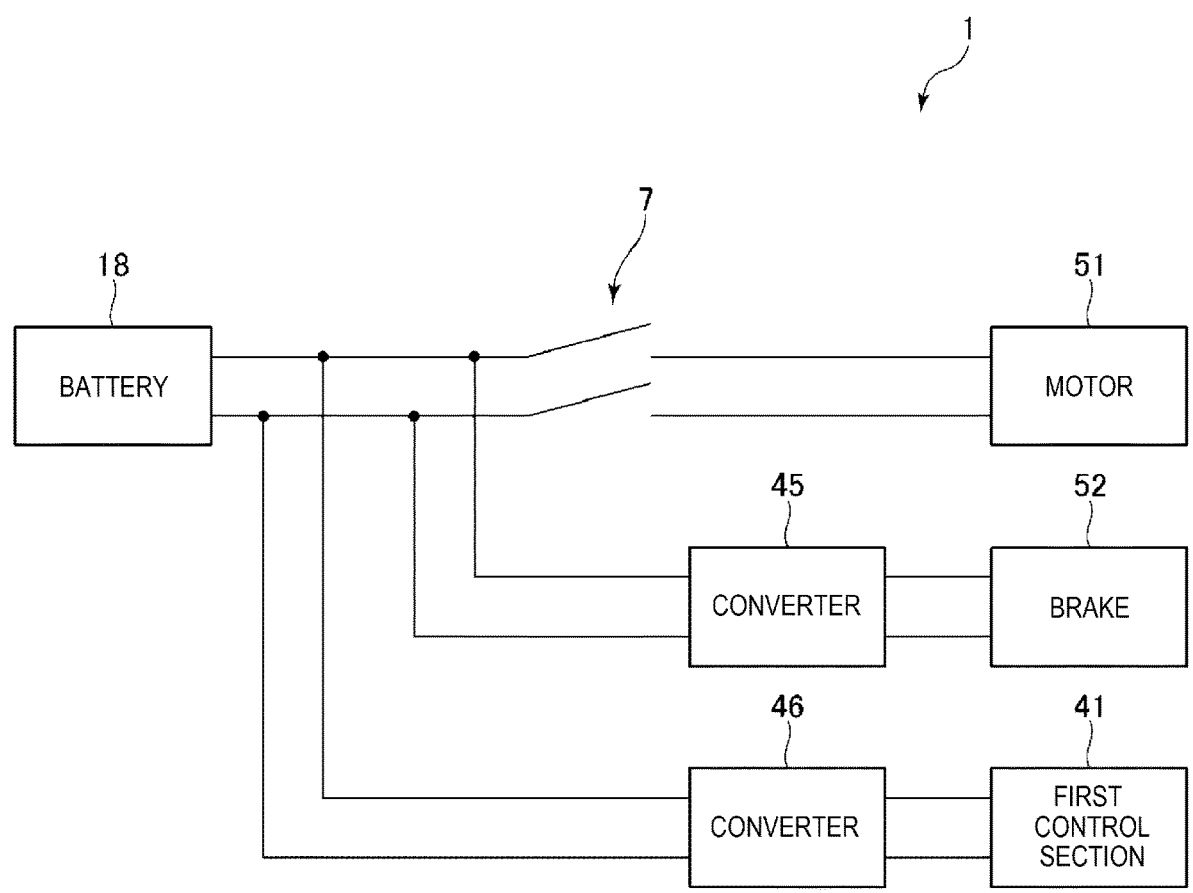
FIG. 6 is a circuit diagram of a robot shown in FIGS. 1 to 4.
Figure 7:
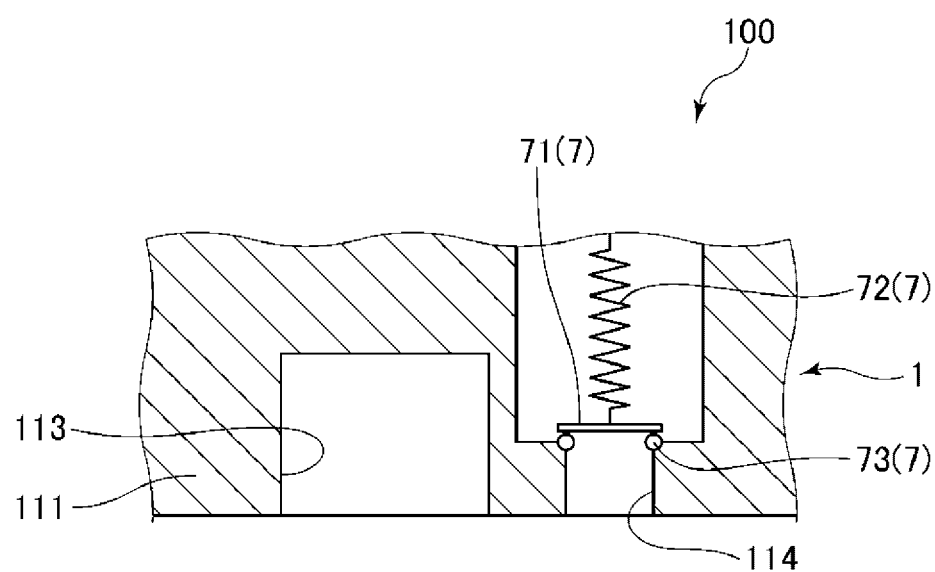
FIG. 7 is a sectional view of a switch mechanism and a lifting member provided in the robot system shown in FIGS. 1 to 4.
Figure 7:
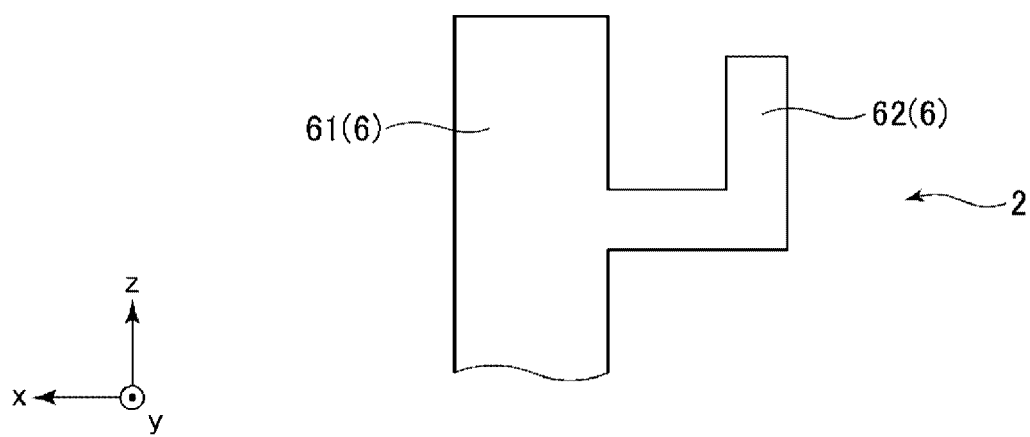
Figure 8:
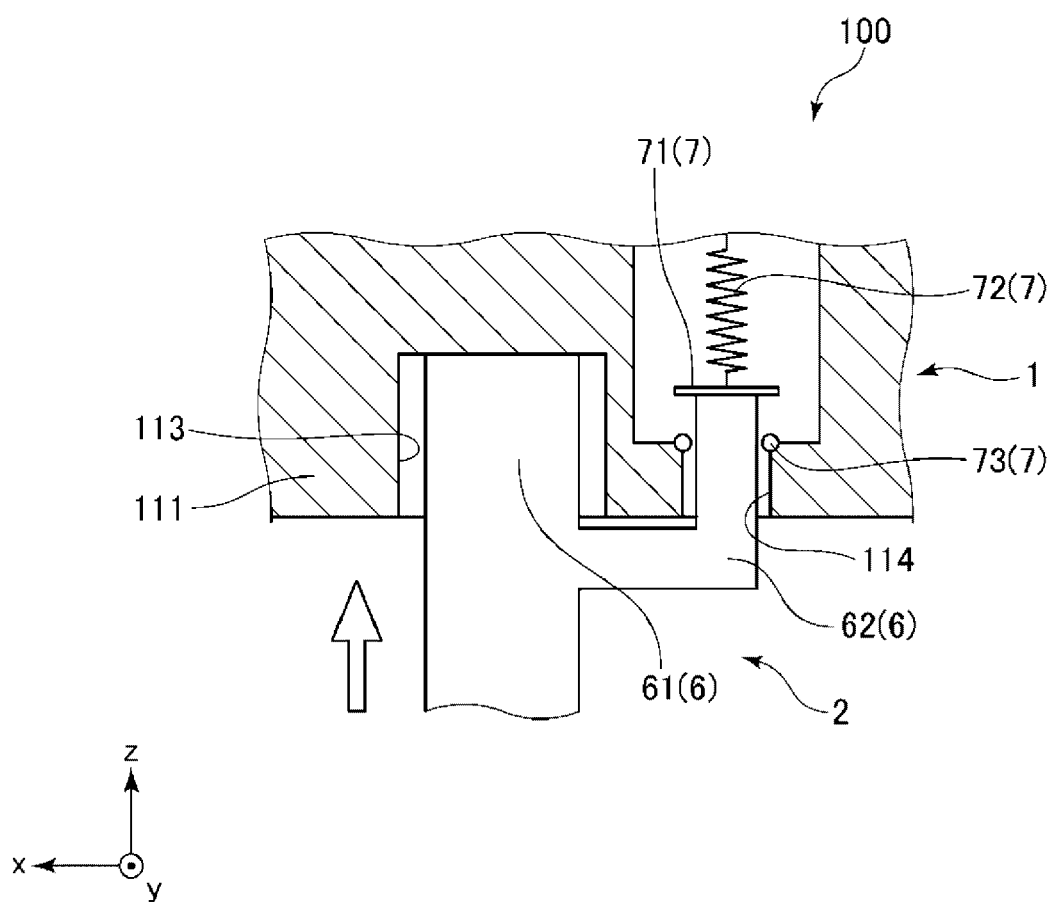
FIG. 8 is a sectional view of the switch mechanism and the lifting member provided in the robot system shown in FIGS. 1 to 4.
Figure 9:
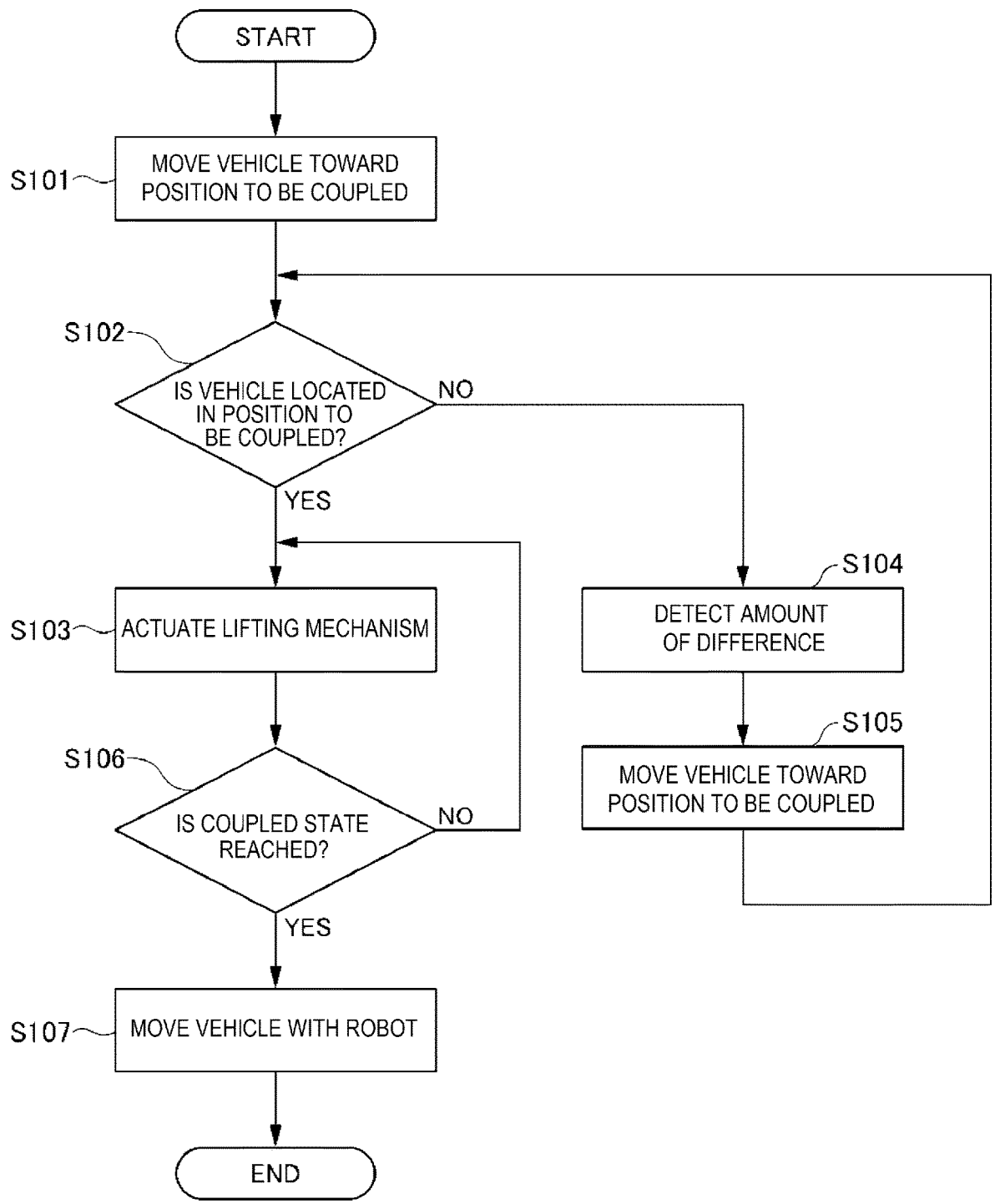
FIG. 9 is a flowchart for explanation of a control operation of a control unit provided in the robot system shown in FIGS. 1 to 4.

FIGS. 1 to 4 are the side views showing the first embodiment of the robot system according to the present disclosure. FIG. 5 is the block diagram of the robot system shown in FIGS. 1 to 4. FIG. 6 is the circuit diagram of the robot shown in FIGS. 1 to 4. FIGS. 7 and 8 are the sectional views of the switch mechanism and the lifting member provided in the robot system shown in FIGS. 1 to 4. FIG. 9 is the flowchart for explanation of the control operation of the control unit provided in the robot system shown in FIGS. 1 to 4.

In FIGS. 1 to 4 (the same applies to FIGS. 7, 8, 11, and 12), for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions".

Further, hereinafter, the pointer sides of the respective arrows in the drawings are referred to as "+ (plus)" or "positive" and the tail sides are referred to as "− (minus)" or "negative". For convenience of explanation, the +z-axis direction, i.e., the upside is also referred to as "upper" or "above" and the −z-axis direction, i.e., the downside is also referred to as "lower" or "below". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

Figure 1:
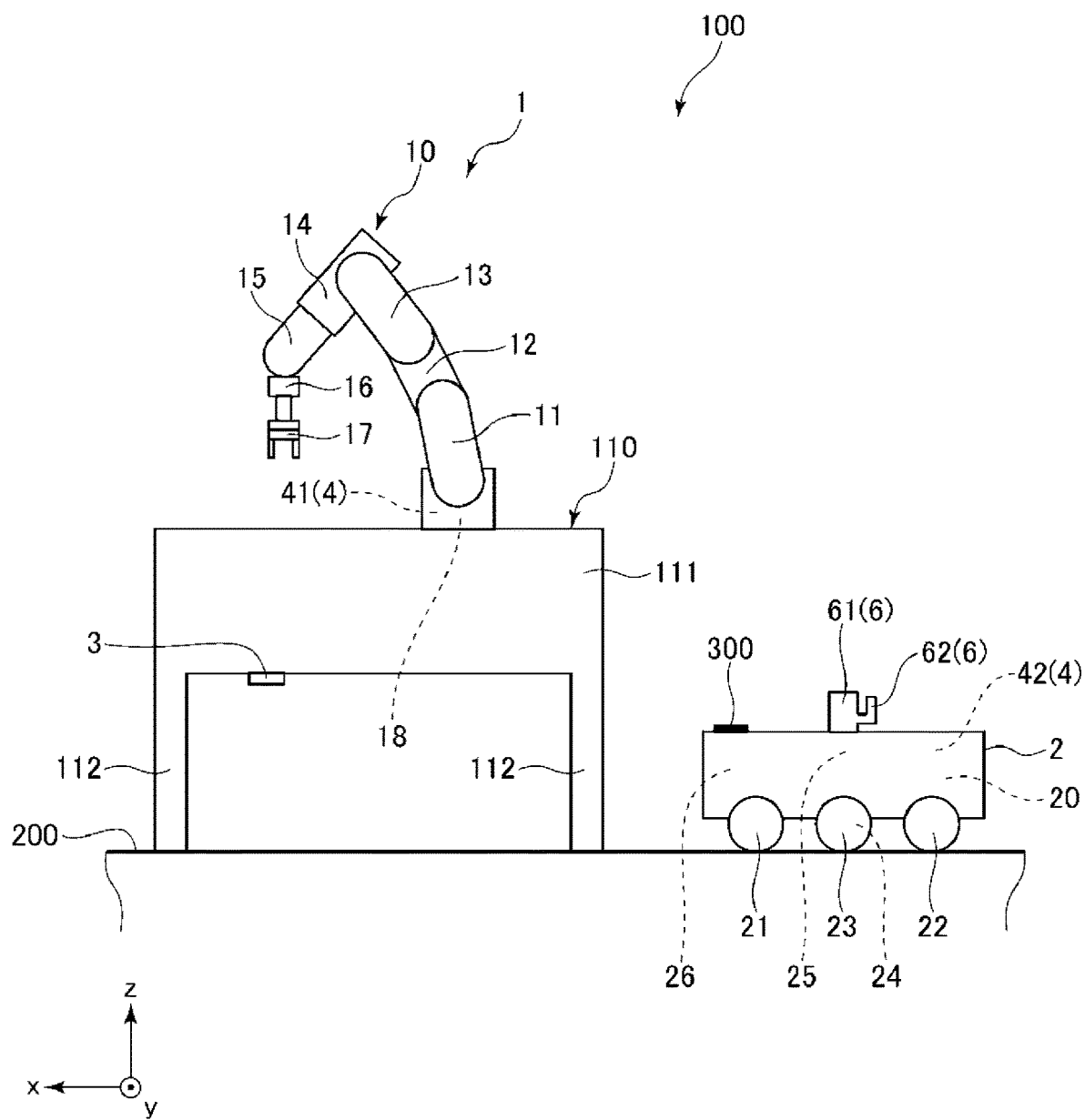
FIG. 1 is a side view showing a first embodiment of a robot system according to the present disclosure.
Figure 2:
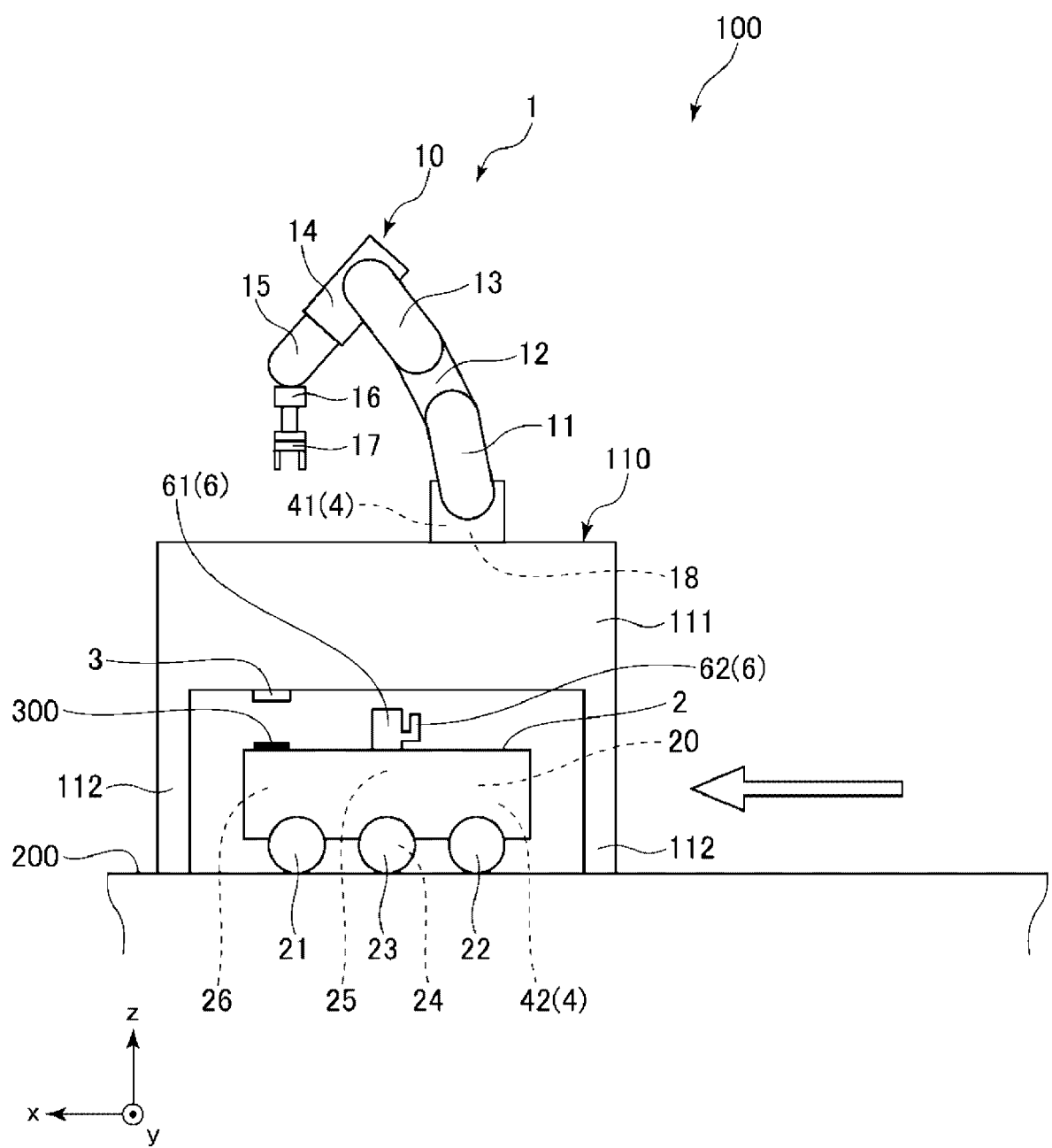
FIG. 2 is a side view showing the first embodiment of the robot system according to the present disclosure.
Figure 3:
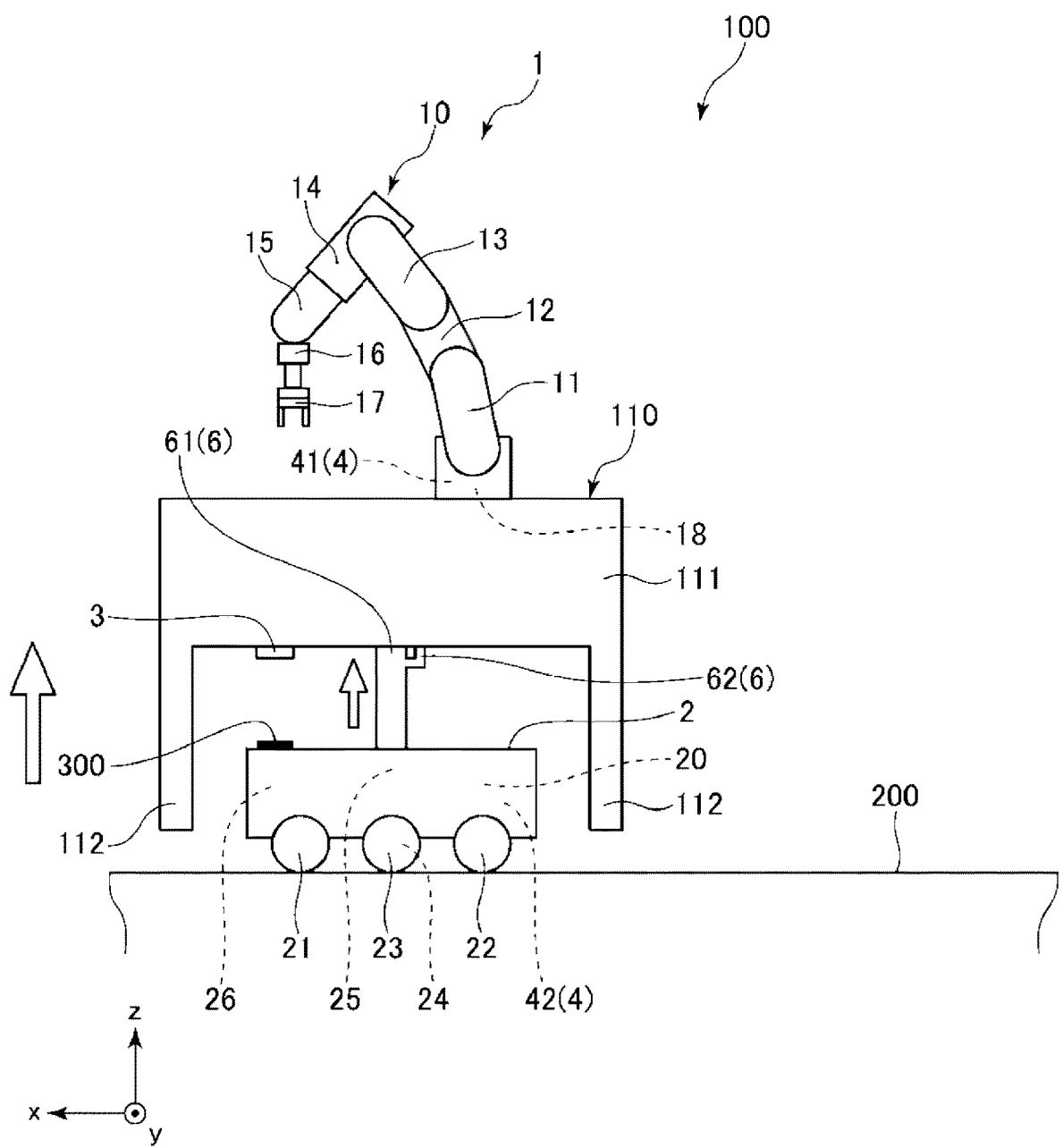
FIG. 3 is a side view showing the first embodiment of the robot system according to the present disclosure.
Figure 4:
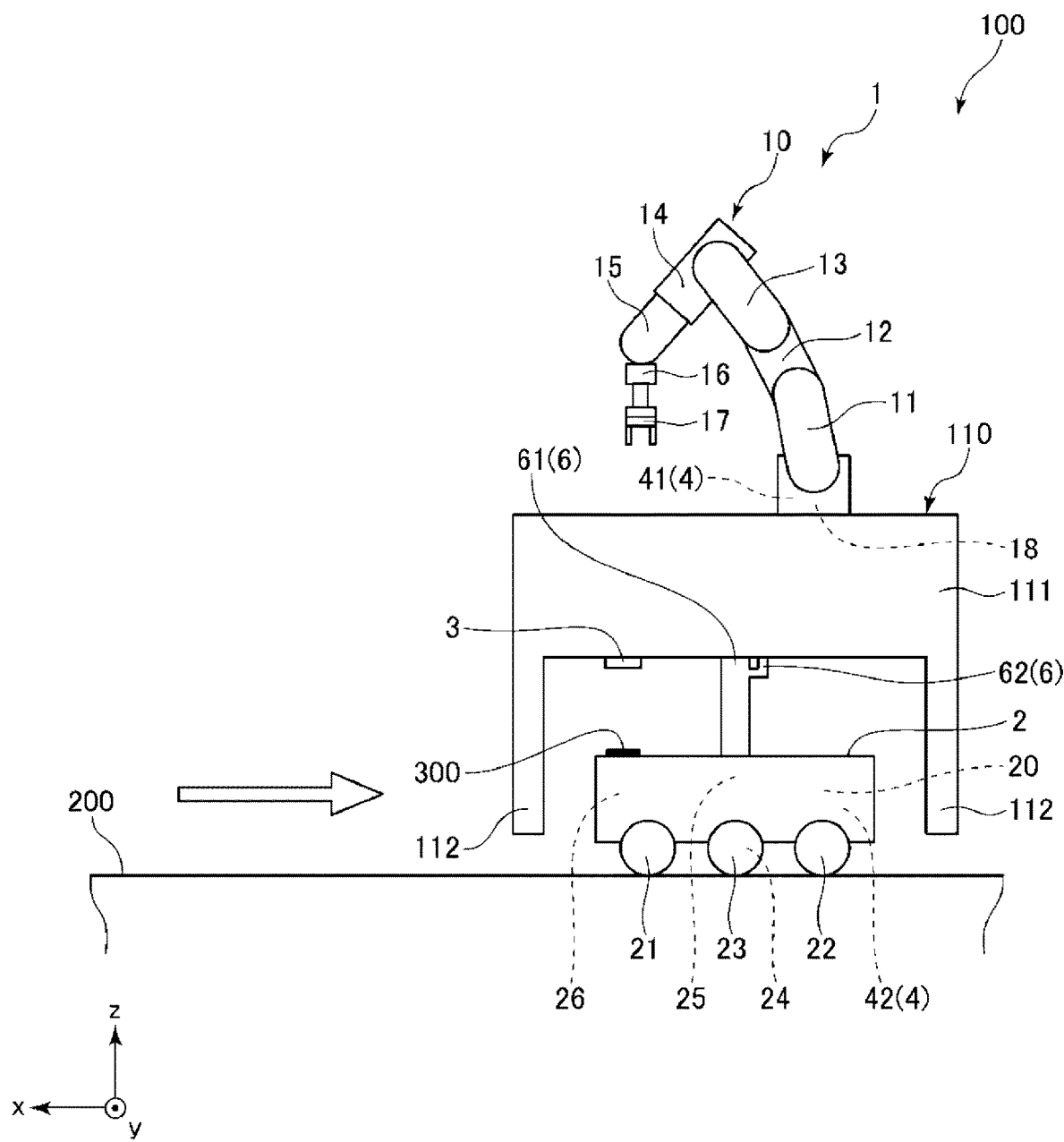
FIG. 4 is a side view showing the first embodiment of the robot system according to the present disclosure.

A robot system 100 shown in FIGS. 1 to 4 is used for work of e.g. holding, transport, assembly, inspection, etc. of works including electronic components and electronic apparatuses. The robot system 100 includes a robot 1 having a base 110 and a robot arm 10, a vehicle 2 having a movement mechanism 20 that moves the base 110, and a detection unit 3. The vehicle 2 may take a decoupled state decoupled from the base 110 as shown in FIGS. 1 and 2 and a coupled state coupled to the base 110 as shown in FIGS. 3 and 4. Here, the decoupled state refers to a contactless state between the vehicle 2 and the base 110. The coupled state also refers to a contact state between the vehicle 2 and the base 110.

The robot 1 shown in FIG. 1 is the so-called six-axis vertical articulated robot and has the base 110 and the robot arm 10 coupled to the base 110.

The base 110 supports the robot arm 10. The base 110 has a housing and, inside of the housing, e.g. a drive device that drives the robot arm 10, a communication unit (not shown) for communication with a control unit 4, etc. are placed. Further, the origin of the robot coordinate system is set in an arbitrary position of the base 110 e.g. the center of gravity. The origin is a control point of the movement by the movement mechanism 20, which will be described later.

The base 110 has a work table 111 and leg parts 112. The work table 111 is a part on which the robot arm 10 performs work. A plurality of, in the embodiment, four of the leg parts 112 are placed at the −z-axis side of the work table 111. The leg parts 112 contact an installation surface 200 of the robot 1 and separate the work table 111 from the installation surface 200. Thereby, the vehicle 2 may enter the downside of the work table 111 from between the respective leg parts 112.

Further, as shown in FIGS. 7 and 8, the base 110 has a recessed portion 113 and a recessed portion 114 provided at the −z-axis side of the work table 111 and opening toward the −z-axis side. The recessed portion 113 is a portion that a supporting portion 61 of a lifting member 6, which will be described later, enters. The recessed portion 114 is a portion that an operation portion 62 of the lifting member 6, which will be described later, enters.

The robot arm 10 shown in FIG. 1 has a proximal end coupled to the base 110 and includes an arm 11, an arm 12, an arm 13, an arm 14, an arm 15, and an arm 16 as a plurality of arms. These arm 11 to arm 16 are sequentially coupled from the proximal end toward the distal end. The respective arm 11 to arm 16 are pivotable relative to the adjacent arms or base 110.

Further, as shown in FIGS. 1 to 5, the robot 1 has a drive unit 5A that pivots the arm 11 relative to the base 110, a drive unit 5B that pivots the arm 12 relative to the arm 11, a drive unit 5C that pivots the arm 13 relative to the arm 12, a drive unit 5D that pivots the arm 14 relative to the arm 13, a drive unit 5E that pivots the arm 15 relative to the arm 14, and a drive unit 5F that pivots the arm 16 relative to the arm 15. As shown in FIG. 5, each of the drive unit 5A to drive unit 5F has a motor 51 as a drive source, a motor driver (not shown) that controls driving of the motor 51, a brake 52 that switches between the locked state and the unlocked state of the motor 51, and an encoder 53 that detects the amount of rotation of the motor 51. These are controlled independently of one another by the control unit 4. The brake 52 is an electromagnetic brake that locks the actuation of the motor 51 when the energization to the brake 52 is interrupted and releases the lock when the brake 52 is energized.

As shown in FIGS. 1 to 4, an end effector 17 that holds a work object is attached to the distal end of the robot arm 10. In the illustrated configuration, the end effector 17 grips the work object by bringing a plurality of e.g. two fingers closer to or away from each other. Note that the end effector 17 is not limited to the configuration, but may be a suction hand, a magnetic hand, a tool such as a drill, or the like.

In the base 110, a battery 18 as a power supply is provided. The battery 18 is a supply unit that supplies electric power to the respective parts of the robot 1 including the drive unit 5A to drive unit 5F, the end effector 17, the detection unit 3, etc. It is preferable that the battery 18 is a secondary cell that can be repeatedly charged and discharged. The secondary cell includes e.g. a nickel-cadmium battery, nickel-hydrogen battery, sodium battery, magnesium battery, lithium-ion battery, and lead storage battery.

Here, the circuit of the robot 1 is explained.

Though simplified in FIG. 6, the respective motors 51 are respectively independently coupled to the battery 18 and independently supplied with electric power from the battery 18. A switch mechanism 7 is provided in wiring between the battery 18 and the respective motors 51. By the switch mechanism 7, a conduction state in which the energization to the motor 51 is allowed and the non-conduction state in which the energization to the motor 51 is interrupted may be switched. In other words, the conduction state in which the battery 18 and the motor 51 are conducting and the non-conduction state in which the battery 18 and the motor 51 are not conducting may be switched by the switch mechanism 7.

In the wiring between the battery 18 and each motor 51, wiring for electric power supply to each brake 52 is branched from the part at the battery 18 side of the switch mechanism 7. Further, a converter 45 is provided in the wiring.

In the wiring between the battery 18 and each motor 51, wiring for electric power supply to a first control section 41 is branched from the part at the battery 18 side of the switch mechanism 7. Further, a converter 46 is provided in the wiring.

The converter 45 and the converter 46 are provided, and thereby, the motor 51, the brake 52, and the first control section 41 at different drive voltages may be driven by the single battery 18.

In the above described embodiment, the conduction state in which the energization to the motor 51 is allowed and the non-conduction state in which the energization to the motor 51 is interrupted may be switched by actuation of the switch mechanism 7, however, regardless of the switching, the first control section 41 and the brake 52 are maintained to be energized.

Next, the switch mechanism 7 is explained.

As shown in FIGS. 7 and 8, the switch mechanism 7 is provided in the bottom part of the recessed portion 114 as described above. The switch mechanism 7 has a movable plate 71 and an urging portion 72 that urges the movable plate 71 toward the −z-axis side.

The movable plate 71 has a portion having conductivity. As shown in FIG. 7, when the operation portion 62 is out of the recessed portion 114, the movable plate 71 is pressed against a terminal 73 of the circuit by the urging force of the urging portion 72. In this state, in the circuit diagram shown in FIG. 6, the switch mechanism 7 is ON and electric power is supplied to the motor 51. Hereinafter, the state is referred to as "conduction state" in which energization to the motor 51 as the drive source is allowed.

On the other hand, as shown in FIG. 8, when the operation portion 62 enters the recessed portion 114, the operation portion 62 pushes up the movable plate 71 toward the +z-axis side against the urging force of the urging portion 72. In this state, the movable plate 71 is separated from the terminal 73 of the circuit, and the switch mechanism 7 is OFF in the circuit diagram shown in FIG. 6. In the state, as described above, the energization to the motor 51 is interrupted, but the control section 41 and the brake 52 are maintained in the states to be energized. Hereinafter, the state is referred to as "non-conduction state" in which the energization to the motor 51 as the drive source is interrupted.

Note that the switch mechanism 7 is not limited to the above described configuration as long as the mechanism reaches the non-conduction state in the coupled state and reaches the conduction state in the decoupled state.

Next, the detection unit 3 is explained.

The detection unit 3 shown in FIGS. 1 to 4 is placed at the −z-axis side of the work table 111, i.e., at the installation surface 200 side. The detection unit 3 has a function of detecting the position relationship between the robot 1 and the vehicle 2 and, in the embodiment, has a function of detecting a marker 300. Here, the marker 300 indicates the position of the vehicle 2 and, in the embodiment, is provided at the upside, i.e., the +z-axis side of the vehicle 2. Further, the marker 300 may include a colored portion in different color from the surrounding parts, a light emitting portion, a laser point marker, and a projection portion such as a projector. The shape of the marker 300 is not particularly limited, but e.g. a QR code (registered trademark) or the like may be used.

The detection unit 3 includes an imaging unit that images the marker 300. The imaging unit is provided with the optical axis along the z-axis directions. Further, the imaging unit is placed face vertically downward. As the imaging unit, a 2D camera that can acquire a two-dimensional image such as a color image, black-and-white image, spectroscopic image, or infrared image can be used. Further, a camera coordinate system is set in the imaging unit and the camera coordinate system was calibrated to the above described robot coordinate system.

The detection unit 3 is configured to communicate with the control unit 4. Accordingly, the detection unit may receive an imaging command signal from the control unit 4 and transmit a captured image to the control unit 4. Note that the connection between the detection unit 3 and the control unit 4 may be not only wired connection but also wireless connection, or connection by communication via a network such as the Internet.

As described above, the detection unit 3 is the imaging unit that images the marker 300. Thereby, the first control section 41, which will be described later, may accurately determine whether or not the current position of the vehicle 2 is a position to be coupled, which will be described later, based on the acquired captured image.

Note that the detection unit 3 may be placed in a different position from the above described placement position. For example, the detection unit may be placed in another part of the base 110, an arbitrary position of the robot arm 10, or another position than those of the robot 1, e.g., the upper part of the vehicle 2. When the detection unit 3 is placed in the upper part of the vehicle 2, the marker 300 is preferably placed on the surface at the −z-axis side of the work table 111.

Further, in the embodiment, the detection unit 3 is the imaging unit, but not limited to that. The detection unit 3 is appropriately selected depending on the combination with the configuration of the marker 300 and may be e.g. a photosensor, force sensor, capacitance sensor, magnetic sensor, or the like. When the force sensor is used, a contact portion may be placed in a target position and contact between the contact portion and an arbitrary part of the robot 1 may be detected.

Or, the above described detection unit 3 may be omitted and a position detection unit that detects the position of itself may be placed in the vehicle 2. In this case, the control unit 4 to be described later receives position information from the position detection unit and compares the information with the target position, and thereby, may determine whether or not the position is the position to be coupled at step S102, which will be described later. Further, an amount of difference may be detected at step S104, which will be described later.

As described above, the robot system 100 includes the detection unit 3 that detects the position relationship between the robot 1 and the vehicle 2. Thereby, as will be described later, a lifting mechanism 25 may be actuated based on the detection result of the detection unit 3. That is, as will be described later, the coupled state may be taken after the state to be coupled is confirmed. Therefore, the supporting portion 61 of the lifting member 6 may be prevented from pushing another part than the predetermined part of the base 110 upward.

Next, the vehicle 2 is explained.

The vehicle 2 is configured by an autonomous traveling system and has the movement mechanism 20 that moves the base 110 according to the command from the control unit 4. The movement mechanism 20 has a plurality of wheels, i.e., a pair of front wheels 21 arranged in the y-axis directions in FIG. 1, a pair of rear wheels 22 arranged in the y-axis directions in FIG. 1, and a pair of drive wheels 23 arranged in the y-axis directions in FIG. 1. The pair of drive wheels 23 are provided between the pair of front wheels 21 and the pair of rear wheels 22. The respective drive wheels 23 are coupled to a drive unit 24 shown in FIG. 2, and rotate by drive power from the drive unit 24 and move the base 110. Note that the pair of front wheels 21 and the pair of rear wheels 22 are driven wheels in the embodiment.

The drive wheels 23 are respectively independently coupled to the drive motors and respectively configured to be forwardly and backwardly rotatable. Accordingly, the vehicle may move forward and backward. The vehicle may be steered so that the traveling direction may be changed by adjustment of at least one of the rotation speed and the rotation direction of each drive wheel 23. Further, in the embodiment, the front wheels 21, the rear wheels 22, and the drive wheels 23 are configured not to rotate about the z-axis, however, at least one of the front wheels 21, the rear wheels 22, and the drive wheels 23 may be configured to rotate about the z-axis. In this case, the vehicle may be steered by adjustment of the amount of rotation about the z-axis.

Note that "movement" in this specification includes not only "linear movement", "curve", "meandering", and "reciprocation" but also "rotation". The number of wheels of the movement mechanism 20 is not particularly limited. The configuration of the movement mechanism 20 is not limited to the above described wheeled type, but may be e.g. a configuration walking with a plurality of legs or the like.

Further, the vehicle 2 has the lifting member 6 and the lifting mechanism 25 as an operation portion movement mechanism that moves the lifting member 6 upward and downward.

The lifting member 6 has a rod shape extending along the z-axis directions and moves along the z-axis directions by the lifting mechanism 25. The lifting member 6 has an end part at the +z-axis side branched to two portions, and one end portion, i.e., the end portion on the left side in FIGS. 7 and 8 functions as the supporting portion 61 and the other end portion, i.e., the end portion on the right side in FIGS. 7 and 8 functions as the operation portion 62.

The supporting portion 61 is a portion that supports the base 110 in the coupled state. That is, the supporting portion 61 is a portion that enters the recessed portion 113 of the base 110 in the coupled state. In contact with the bottom part of the recessed portion 113, the supporting portion 61 lifts the base 110 and can move the robot 1. The operation portion 62 is a portion that enters the recessed portion 114 of the base 110 and, inside of the recessed portion 114, as described above, turns OFF the switch mechanism 7 and provides the non-conduction state.

As described above, the base 110 has the recessed portion 114 that the operation portion 62 enters in the coupled state and the switch mechanism 7 is placed in the recessed portion 114. Thereby, in the decoupled state, application of some external force to the switch mechanism 7 and unintended operation of the switch mechanism 7 may be prevented or suppressed.

The lifting mechanism 25 includes e.g. a solenoid and various cylinders, and is actuated by energization to move the lifting member 6 along the z-axis directions. As shown in FIG. 5, the lifting mechanism 25 is electrically coupled to a second control section 42 and the actuation thereof is controlled.

As described above, the vehicle 2 includes the lifting mechanism 25 as the operation portion movement mechanism that brings the operation portion 62 closer to and away from the switch mechanism 7. Thereby, whether the vehicle 2 takes the coupled state or the decoupled state may be determined.

Note that the lifting mechanism 25 may be omitted and the robot 1 may be configured to move downward when the vehicle can be coupled. Even in this case, the effects of the present disclosure, which will be described later, may be obtained. This configuration can be realized by placement of e.g. extension mechanisms, i.e., lifting mechanisms in the leg parts 112.

Further, as shown in FIGS. 1 to 4, a battery 26 as a power supply is provided in the vehicle 2. The battery 26 supplies electric power to the respective parts of the vehicle 2 including the drive unit 24 and the lifting mechanism 25. The battery 26 includes the same one as exemplified as the above described battery 18.

Next, the control unit 4 is explained.

The control unit 4 has the first control section 41 that controls the actuation of the robot arm 10 and the detection unit 3 and the second control section 42 that controls actuation of the movement mechanism 20 and the lifting mechanism 25.

The first control section 41 controls the actuation of the robot arm 10 and has a CPU (Central Processing Unit) 411, a memory unit 412, and a communication unit 413.

The CPU 411 reads and executes various programs etc. stored in the memory unit 412. The command signal generated in the CPU 411 is transmitted to the robot 1 via the communication unit 413. Thereby, the robot arm 10 may execute predetermined work.

The memory unit 412 stores various programs etc. that can be executed by the CPU 411. The memory unit 412 includes e.g. a volatile memory such as a RAM (Random Access Memory), a nonvolatile memory such as a ROM (Read Only Memory), and a detachable external memory device. The connection between the memory unit 412 and the first control section 41 may be not only wired connection but also wireless connection, or connection by communication via a network such as the Internet.

The communication unit 413 respectively transmits and receives signals between the robot 1, the second control section 42, and an input unit 43 and itself using an external interface e.g. wired LAN (Local Area Network) or wireless LAN.

The second control section 42 controls the actuation of the movement mechanism 20 and the lifting mechanism 25 and has a CPU 421 as a control part, a memory unit 422, and a communication unit 423.

The CPU 421 reads and executes various programs etc. stored in the memory unit 422. The command signal generated in the CPU 421 is transmitted to the movement mechanism 20 and the lifting mechanism 25 via the communication unit 423. Thereby, the vehicle 2 may be moved to a desired position and the lifting mechanism 25 may be actuated at a predetermined time.

The memory unit 422 stores various programs etc. that can be executed by the CPU 421. The memory unit 422 includes e.g. a volatile memory such as a RAM (Random Access Memory), a nonvolatile memory such as a ROM (Read Only Memory), and a detachable external memory device.

The communication unit 423 respectively transmits and receives signals between the movement mechanism 20, the detection unit 3, the first control section 41, and the input unit 43 and itself using an external interface e.g. wired LAN (Local Area Network) or wireless LAN.

In the embodiment, the first control section 41 controls the actuation of the robot arm 10 and the second control section 42 controls the actuation of the movement mechanism 20, however, the present disclosure is not limited to that. A single control section may serve as the first control section 41 and the second control section 42. That is, the single control section may be configured to control the actuation of the robot arm 10, the movement mechanism 20, and the detection unit 3.

The configuration part of the control unit 4 may be partially or entirely placed within the base 110 of the robot 1 or within the vehicle 2, partially or entirely placed outside of the base 110, or partially or entirely placed in a remote location via a network such as the Internet.

Further, the control unit 4 has a terminal to which a command from an input device 44 is input, i.e., an input port. This part functions as the input unit 43 to which various kinds of information is input.

The input device 44 is a device for various settings for the control unit 4 by the user inputting information. The input device 44 is not particularly limited to, but includes e.g. a tablet, personal computer, smartphone, and teaching pendant. The connection of the input device 44 may be not only wired connection but also wireless connection, or connection by communication via a network such as the Internet.

As above, the configuration of the robot system 100 is explained.

In the robot system 100, the vehicle 2 often moves the robot 1 when the robot 1 ends work and is returned to a waiting position, when the robot is moved to a working position for work, or the like. When the robot 1 is moved, as shown in FIGS. 1 and 2, first, the vehicle 2 enters below the robot 1. That is, the vehicle 2 enters below the base 110. Then, when the vehicle can be coupled, that is, the supporting portion 61 is located immediately below the recessed portion 113, as shown in FIG. 3, the lifting mechanism 25 is actuated, the lifting member 6 is moved upward into the recessed portion 113 (see FIG. 8), and the base 110 is lifted. Concurrently, the leg parts 112 of the base 110 are separated from the installation surface 200.

Further, concurrently, as shown in FIG. 8, the operation portion 62 turns OFF the switch mechanism 7 and the non-conduction state is provided. Then, in the non-conduction state, as shown in FIG. 4, the movement mechanism 20 is actuated to move the vehicle 2 together with the robot 1. Thereby, the robot 1 may be moved to the desired position. During the movement, the robot 1 is in the non-conduction state in which the energization to the motor 51 is interrupted, and thereby, the actuation of the robot arm 10 by unintended energization during the movement may be prevented. As a result, safety during movement may be increased.

Note that, from the state shown in FIG. 8, the lifting mechanism 25 is actuated to move the lifting member 6 to the −z-axis side and the decoupled state shown in FIG. 7 is reached, and thereby, the movable plate 71 is pressed against the terminal 73 of the circuit by the urging force of the urging portion 72 of the switch mechanism 7, that is, the conduction state is reached.

In the embodiment, in the non-conduction state, the the brake 52 can be energized. Accordingly, the brake 52 locking the actuation of the motor 51 may be released. Therefore, in the non-conduction state, the operator may change the posture of the robot arm 10 by applying an external force to the robot arm 10. As a result, the posture of the robot arm 10 during movement (transport) may be changed to e.g. a posture in which contact of the robot arm 10 with the outside environment may be avoided, and the safety may be further increased.

As described above, the drive unit 5A to drive unit 5F have the brakes 52 that lock the actuation of the motors 51 as the drive sources when the energization is interrupted and release the lock when energized. In the coupled state, the brakes 52 can release the lock of the actuation of the motors 51. In the non-conduction state, the operator may change the posture of the robot arm 10 by applying an external force to the robot arm 10. As a result, the safety during movement may be further increased.

As described above, the vehicle 2 has the supporting portion 61 that supports the base 110 in the coupled state. Further, the supporting portion 61 moves in conjunction with the operation portion 62 by the lifting mechanism 25 as the operation portion movement mechanism. Thereby, the supporting portion 61 and the operation portion 62 may be moved upward and downward at the same time by the single lifting mechanism 25.

As described above, the base 110 has the leg parts 112, and the leg parts 112 are separated from the installation surface 200 of the robot 1 in the coupled state and contact the installation surface 200 in the decoupled state. Thereby, when the robot 1 is moved, the movement may be easily performed.

As described above, the robot system 100 includes the robot 1 having the base 110, the robot arm 10 coupled to the base 110, the motor 51 as the drive source that drives the robot arm 10, the battery 18 as the supply unit that supplies electric power to the motor 51, and the switch mechanism 7 that switches between the conduction state in which the motor 51 and the battery 18 are conducting and the non-conduction state in which the motor 51 and the battery 18 are not conducting, and the vehicle 2 having the movement mechanism 20 that transports the robot 1 and the operation portion 62 that operates the switch mechanism 7 and turns the conduction state to the non-conduction state, and configured to take the coupled state in which the vehicle is coupled to the base 110 and the decoupled state in which the vehicle is decoupled from the base 110. Further, in the coupled state, the operation portion 62 operates the switch mechanism 7. Thereby, when the robot 1 is moved in the coupled state, the robot 1 is in the non-conduction state in which the energization to the motor 51 is interrupted, and the actuation of the robot arm 10 by unintended energization during the movement may be prevented. As a result, the safety during movement may be increased.

Next, the control operation of the control unit 4, i.e., the control method for robot system according to the present disclosure will be explained. Note that the following control operation will be explained regarding the case where the first control section 41 controls the actuation of the robot 1 and the second control section 42 controls the actuation of the vehicle 2.

First, as shown in FIG. 9, at step S101, the vehicle 2 is moved toward the position to be coupled. Then, at step S102, whether or not the vehicle 2 is located in the position to be coupled is determined. The determination is performed based on the detection result of the detection unit 3. That is, whether or not the marker 300 attached to the vehicle 2 is located in a predetermined position in the captured image captured by the detection unit 3 is determined.

When the determination that the vehicle 2 is not located in the position to be coupled is made at step S102, an amount of difference between the robot 1 and the vehicle 2 is detected at step S104. This detection is performed by calculation of the amount of difference of the position of the marker 300 attached to the vehicle 2 from the predetermined position in the captured image captured by the detection unit 3. Note that, at the step, a direction of difference is calculated in addition to the amount of difference.

Then, at step S105, the vehicle 2 is moved toward the position to be coupled. At step S105, the vehicle 2 is moved based on the amount and the direction of difference detected at step S104. Then, the process returns to step S102.

When the determination that the vehicle 2 is located in the position to be coupled is made at step S102, the lifting mechanism 25 is actuated at step S103. That is, the lifting member 6 is moved toward the +z-side. Concurrently, the operation portion 62 operates the switch mechanism 7 and provides the non-conduction state.

Then, at step S106, whether or not the coupled state is reached is determined. This determination is performed based on e.g. whether or not the amount of movement of the lifting member 6 by the lifting mechanism 25 reaches a predetermined amount. Note that step S106 may be omitted.

When the determination that the coupled state is reached is made at step S106, the vehicle 2 is moved together with the robot 1 at step S107. That is, the vehicle 2 supporting the robot 1 is moved to the desired position. Thereby, the movement of the robot 1 is completed. Note that, when the determination that the coupled state is not reached is made at step S106, the process returns to step S103.

As described above, the control method for the robot system 100 according to the present disclosure is the control method for the robot system 100 including the robot 1 having the base 110, the robot arm 10 coupled to the base 110, the motor 51 as the drive source that drives the robot arm 10, the battery 18 as the supply unit that supplies electric power to the motor 51, and the switch mechanism 7 that switches between the conduction state in which the motor 51 and the battery 18 are conducting and the non-conduction state in which the motor 51 and the battery 18 are not conducting, the vehicle 2 having the movement mechanism 20 that transports the robot 1 and the operation portion 62 that operates the switch mechanism 7 and turns the conduction state to the non-conduction state, and taking the coupled state in which the vehicle is coupled to the base 110 and the decoupled state in which the vehicle is decoupled from the base 110, and the detection unit 3 that detects the position relationship between the robot 1 and the vehicle 2. Further, the control method for the robot system 100 according to the present disclosure has the step of determining whether or not the base 110 and the vehicle 2 can be coupled based on the detection result of the detection unit 3 and the step of operating the switch mechanism 7 by the operation portion 62 by bringing at least one of the robot 1 and the vehicle 2 closer to the other based on the determination result at the determination step. Thereby, when the robot 1 is moved in the coupled state, the robot 1 is in the non-conduction state in which the energization to the motor 51 is interrupted, and the actuation of the robot arm 10 by unintended energization during the movement may be prevented. Further, the operation portion 62 operates the switch mechanism 7 based on the detection result of the detection unit 3, and thereby, the operation may be accurately performed. Thus, according to the present disclosure, the safety during movement may be increased.

Second Embodiment

Figure 10:
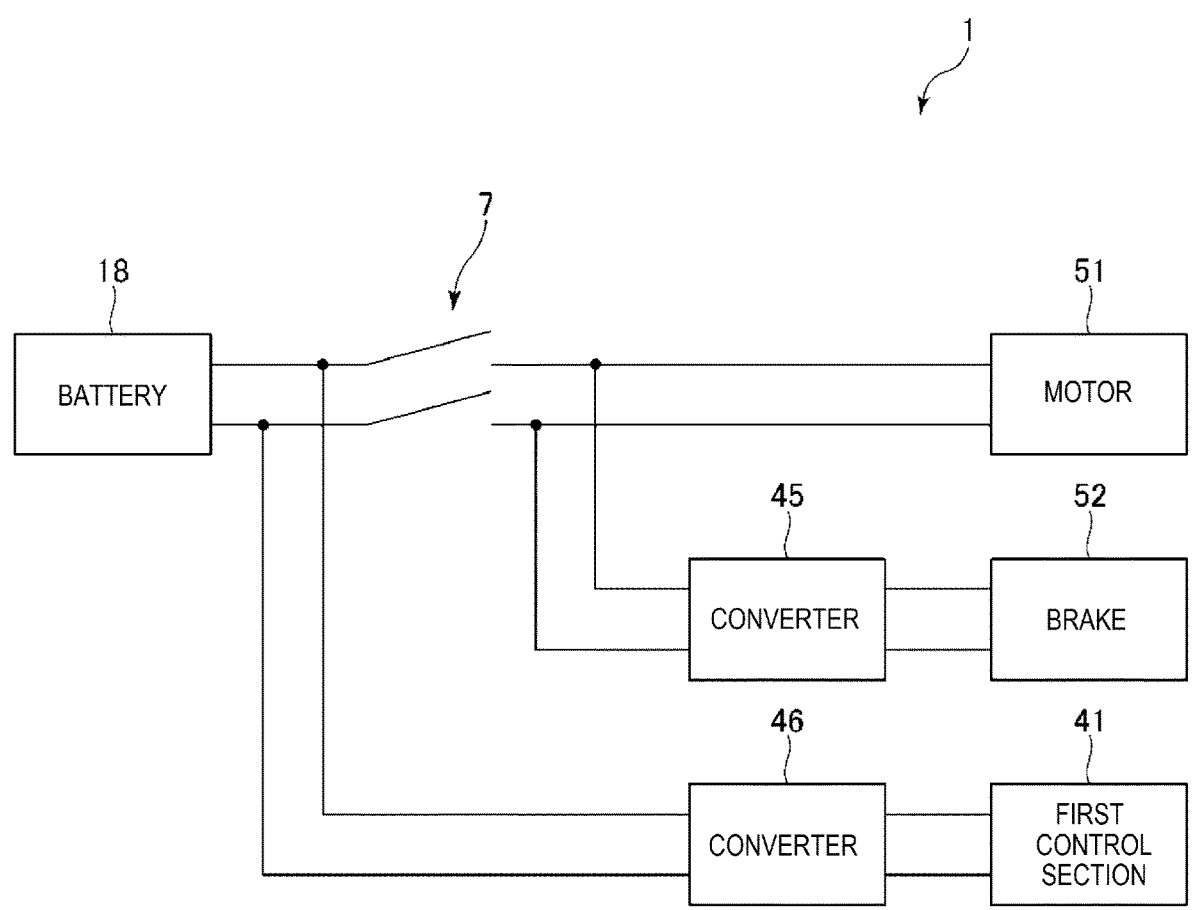
FIG. 10 is a circuit diagram of a robot provided in a second embodiment of the robot system according to the present disclosure.

FIG. 10 is the circuit diagram of the robot provided in the second embodiment of the robot system according to the present disclosure.

As below, the second embodiment will be explained, and the explanation will be made with a focus on differences from the first embodiment and the explanation of the same items will be omitted.

As shown in FIG. 10, in the embodiment, the switch mechanism 7 is provided between a part in which wiring for supplying electric power to the first control section 41 is branched and a part in which wiring for supplying electric power to the respective brakes 52 is branched in the wiring between the battery 18 and the respective motors 51. Accordingly, electric power can be supplied to the brakes 52 in the conduction state in which the energization is allowed to the motors 51, and supply of electric power to the brakes 52 is interrupted in the non-conduction state in which the energization to the motors 51 is interrupted by the actuation of the switch mechanism 7. Accordingly, in the coupled state, the motors 51 are locked by the brakes 52.

As described above, the drive unit 5A to drive unit 5F have the brakes 52 that lock the actuation of the motors 51 as the drive sources when the energization is interrupted and release the lock when energized. In the coupled state, the brakes 52 lock the actuation of the motors 51. Thereby, when the vehicle 2 moves the robot 1, the robot arm 10 is locked. Therefore, even when an external force is unintentionally applied to the robot arm 10 during movement, deformation of the posture of the robot arm 10 may be prevented or suppressed.

Third Embodiment

Figure 11:
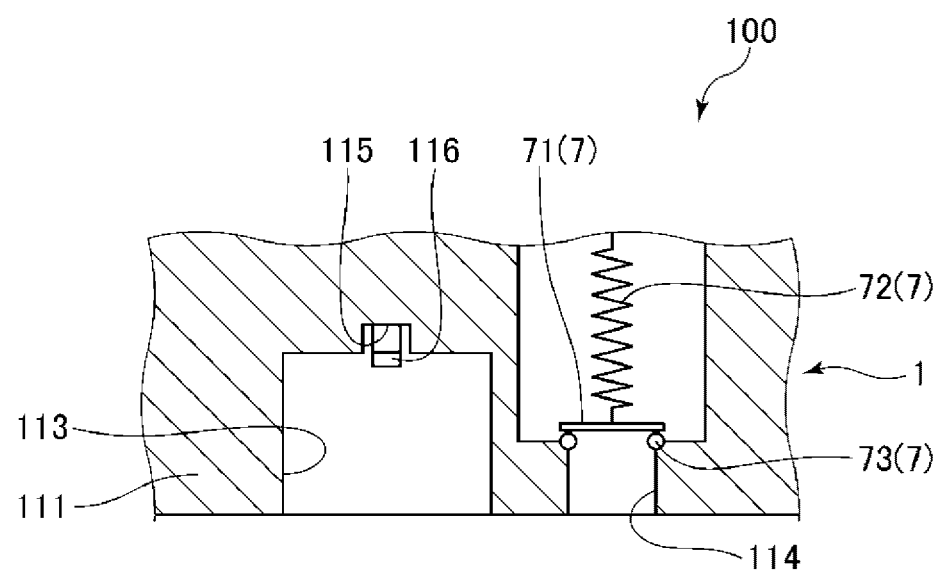
FIG. 11 is a sectional view of a switch mechanism and a lifting member provided in a third embodiment of the robot system according to the present disclosure.
Figure 11:
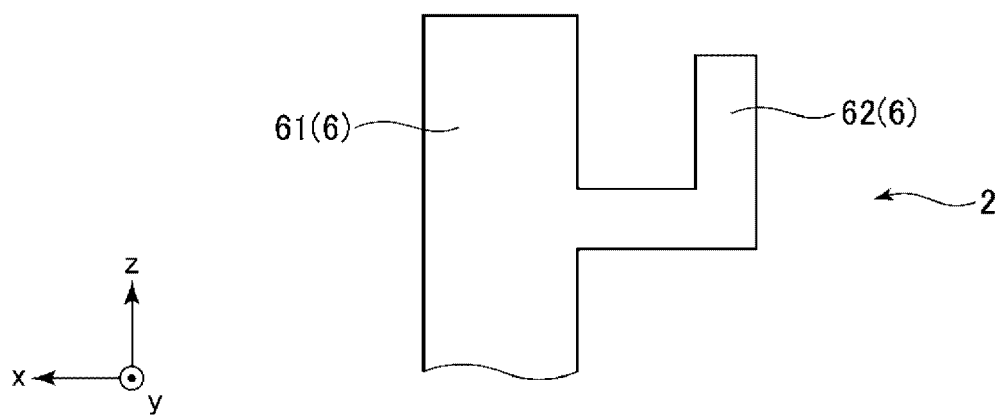
Figure 12:
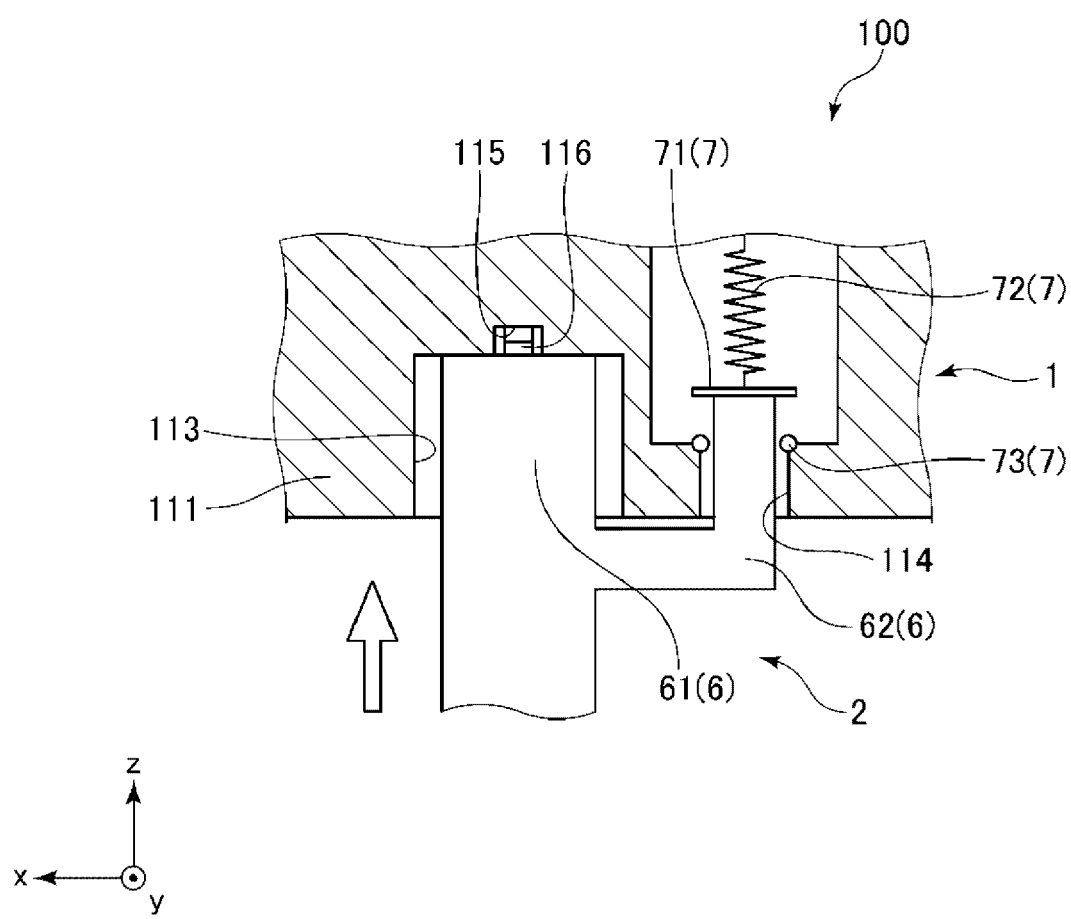
FIG. 12 is a sectional view of the switch mechanism and the lifting member provided in the third embodiment of the robot system according to the present disclosure.

FIGS. 11 and 12 are the sectional views of the switch mechanism and the lifting member provided in the third embodiment of the robot system according to the present disclosure.

As below, the third embodiment will be explained, and the explanation will be made with a focus on differences from the first embodiment and the explanation of the same items will be omitted.

As shown in FIGS. 11 and 12, in the embodiment, a concave portion 115 is provided in the bottom part of the recessed portion 113. Further, a posture change button 116 is provided in the concave portion 115. The posture change button 116 is provided to project into the recessed portion 113 from the concave portion 115. Accordingly, when the lifting member 6 moves upward, the supporting portion 61 presses the posture change button 116 before the operation portion 62 operates the switch mechanism 7.

Further, the posture change button 116 is electrically coupled to the control unit 4 shown in FIG. 5 and, when pressed by the supporting portion 61, transmits an electrical signal to the control unit 4. When the first control section 41 of the control unit 4 receives the electrical signal, the robot arm 10 is changed into a posture suitable for movement.

The posture suitable for movement includes e.g. a home position of the robot arm 10 and a posture in which the maximum height of the robot arm 10 is minimized.

According to the embodiment, when the lifting member 6 is moved upward into the coupled state, the posture change button 116 is pressed and the robot arm 10 is changed into the posture suitable for movement before the operation portion 62 operates the switch mechanism 7. Then, the operation portion turns OFF the switch mechanism 7 and provides the non-conduction state. Thereby, when the vehicle 2 moves the robot 1, actuation of the robot arm 10 by unintended energization may be prevented and the robot arm takes the posture suitable for movement. As a result, the safety when the robot 1 is moved may be further increased.

As above, the robot system and control method for robot system according to the present disclosure are explained based on the illustrated embodiments, however, the present disclosure is not limited to those. The configurations of the respective parts of the robot system may be replaced by arbitrary structures having the same functions. Further, another arbitrary structure may be added thereto. The respective steps of the control method for robot system may be replaced by arbitrary steps that exert the same effects. Further, another arbitrary step may be added thereto.

In the above described embodiments, the number of rotation axes of the robot arm is six, however, not limited to that in the present disclosure. The number of rotation axes of the robot arm may be e.g. one to five, seven, or more. That is, in the above described embodiments, the number of arms is six, however, not limited to that in the present disclosure. The number of arms may be e.g. one to five, seven, or more.

What is claimed is:

1. A robot system comprising:
a robot having a base, a robot arm coupled to the base, a motor that drives the robot arm, a supply unit that supplies electric power to the motor, and a switch mechanism that switches between a conduction state in which the motor and the supply unit are conducting and a non-conduction state in which the motor and the supply unit are not conducting; and a vehicle having a movement mechanism that transports the robot and an operation portion that operates the switch mechanism and turns the conduction state to the non-conduction state, and being configured to take a coupled state in which the vehicle is coupled to the base and a decoupled state in which the vehicle is decoupled from the base, wherein the operation portion operates the switch mechanism in the coupled state, the base has a recessed portion that the operation portion enters in the coupled state, and the switch mechanism is placed in the recessed portion.

2. The robot system according to claim 1, wherein the vehicle includes an operation portion movement mechanism that moves the operation portion closer to or away from the switch mechanism.

3. The robot system according to claim 2, wherein the vehicle has a supporting portion that supports the base in the coupled state, and the supporting portion moves in conjunction with the operation portion by the operation portion movement mechanism.

4. The robot system according to claim 1, wherein the base has a leg part, and the leg part is separated from an installation surface of the robot in the coupled state and contacts the installation surface in the decoupled state.

5. The robot system according to claim 1, further comprising a brake that locks actuation of the motor in the non-conduction state and releases the lock when energized, wherein the brake is configured to release the lock of the actuation of the motor in the coupled state.

6. The robot system according to claim 1, further comprising a brake that locks actuation of the motor in the non-conduction state and releases the lock when energized, wherein the brake locks the actuation of the motor in the coupled state.

7. The robot system according to claim 1, further comprising a detection unit that detects a position relationship between the robot and the vehicle.

8. A robot system comprising:

a robot having a base, a robot arm coupled to the base, a motor that drives the robot arm, a supply unit that supplies electric power to the motor, and a switch mechanism that switches between a conduction state in which the motor and the supply unit are conducting and a non-conduction state in which the motor and the supply unit are not conducting; and a vehicle having a movement mechanism that transports the robot and an operation that operates the switch mechanism and turns the conduction state to the non-conduction state, and being configured to take a coupled state in which the vehicle is coupled to the base and a decoupled state in which the vehicle is decoupled from the base, wherein the operation portion operates the switch mechanism in the coupled state, and the conduction state is taken in the decoupled state.

9. A control method for a robot system including a robot having a base, a robot arm coupled to the base, a motor that drives the robot arm, a supply unit that supplies electric power to the motor, and a switch mechanism that switches between a conduction state in which the motor and the supply unit are conducting and a non-conduction state in which the motor and the supply unit are not conducting, a vehicle having a movement mechanism that transports the robot and an operation portion that operates the switch mechanism and turns the conduction state to the non-conduction state, and being configured to take a coupled state in which the vehicle is coupled to the base and a decoupled state in which the vehicle is decoupled from the base, and a detection unit that detects a position relationship between the robot and the vehicle, the control method comprising:

determining whether or not the base and the vehicle can be coupled based on a detection result of the detection unit, and operating the switch mechanism by the operation portion by bringing at least one of the robot and the vehicle closer to the other based on a determination result at the determination step, wherein the base has a recessed portion that the operation portion enters in the coupled state, and the switch mechanism is placed in the recessed portion.

* * * * *